United States Patent [19]
Kato

[11] Patent Number: 4,955,254
[45] Date of Patent: Sep. 11, 1990

[54] ECCENTRICITY CONTROL DEVICE

[75] Inventor: Heizaburo Kato, Shizuoka, Japan

[73] Assignee: Sankyo Manufacturing Company, Ltd., Tokyo, Japan

[21] Appl. No.: 291,165

[22] Filed: Dec. 28, 1988

[30] Foreign Application Priority Data

Dec. 29, 1987 [JP] Japan ................. 62-333164

[51] Int. Cl.⁵ .................. G05G 1/00; B30B 5/00; B30B 1/06
[52] U.S. Cl. .................. 74/603; 74/571 L; 74/571 R; 100/257; 100/282; 100/292
[58] Field of Search ............... 100/257, 214, 282, 292; 74/571 M, 571 R, 571 L, 603; 83/530, 527, 628

[56] References Cited

U.S. PATENT DOCUMENTS

| | | | |
|---|---|---|---|
| 1,788,071 | 1/1931 | Strout | 100/257 X |
| 2,310,209 | 2/1943 | Bousman | 74/571 L |
| 2,594,836 | 4/1952 | Wunderlich et al. | 74/571 L |
| 3,196,802 | 7/1965 | Matheny . | |

FOREIGN PATENT DOCUMENTS

| | | |
|---|---|---|
| 163155 | 9/1905 | Fed. Rep. of Germany . |
| 538134 | 11/1931 | Fed. Rep. of Germany . |
| 51-12150 | 4/1976 | Japan . |
| 57-14499 | 1/1982 | Japan .................. 100/257 |

*Primary Examiner*—Harvey C. Hornsby
*Assistant Examiner*—Stephen F. Gerrity
*Attorney, Agent, or Firm*—Pollock, Vande Sande & Priddy

[57] ABSTRACT

An eccentricity control device, suitable for use as a slide stroke control device in a press, has a rotary shaft including an eccentric member mounting portion, and an eccentric member mounted on the eccentric member mounting portion. The eccentric member has an outer peripheral surface which is at an eccentricity from the axis of the rotary shaft and sliding surfaces which are held in sliding engagement with both side surfaces of the eccentric member holding portion of the rotary shaft. A screw rod is screwed into the eccentric member mounting portion and extends through the eccentric member mounting portion in a direction perpendicular to the axis of the rotary shaft. The screw rod has both ends rotatably supported by the eccentric member such that a rotation of the screw shaft causes the eccentric member to move in the axial direction of the screw rod together with the screw rod, thereby causing a change in the amount of eccentricity of the outer peripheral surface of the eccentric member with respect to the axis of the rotary member.

1 Claim, 2 Drawing Sheets

ECCENTRICITY CONTROL DEVICE

BACKGROUND OF THE INVENTION

The present invention relates to an eccentricity control device which is suitable for use in, for example, a slide actuating mechanism of a press for the purpose of controlling the sliding stroke length of the slide of the press.

A stroke control mechanism for a press has been known which incorporates, as disclosed in Japanese Patent Examined Publication No. 51-12150 (see related U.S. Pat. No. 3,765,266), an eccentricity control device which employs a pair of eccentric members. More specifically, this stroke control mechanism incorporates an eccentricity control device which has an eccentric shaft portion of a rotary shaft, and an eccentric sleeve rotatably mounted on the outer surface of the eccentric shaft portion for a rotation relative thereto, the outer peripheral surface of the eccentric sleeve being at an eccentricity from the axis of the eccentric shaft portion. The eccentricity control device further has a connecting rod, the upper end of which rotatably fits around the eccentric sleeve, while the lower end of the connecting rod is connected to a slide. In operation, the eccentric shaft portion is rotated relative to the eccentric sleeve so as to vary the amount of eccentricity and, hence, the stroke length of the slide. The eccentricity control device further incorporates a releasable locking mechanism which, when the press which drives the rotary shaft operates, locks the eccentric shaft portion and the eccentric sleeve against relative rotation, whereas, when the eccentricity is to be varied, unlocks them from each other so as to allow a relative rotation therebetween.

This known eccentricity control device, however, suffers from a disadvantages in that the construction is inevitably complicated due to the use of the releasable locking mechanism. Another problem encountered with this known eccentricity control device is that, since the transmission of the torque from the eccentric shaft portion to the eccentric sleeve is conducted indirectly through the above-mentioned locking mechanism, the rigidity of the path of torque transmission is undesirably reduced to impair the precision in the torque transmission. Still another problem is that the eccentricity cannot be varied linearly due to the fact that the locking mechanism which locks the eccentric shaft portion and the eccentric sleeve against relative rotation is designed to change the locking position non-linearly, that is in a stepped manner.

SUMMARY OF THE INVENTION

Accordingly, an object of the present invention is to provide an eccentricity control device which is capable of overcoming the above-described problems of the prior art.

To this end, according to the present invention, there is provided an eccentricity control device comprising: a rotary shaft having an eccentric member mounting portion; an eccentric member mounted on the eccentric member mounting portion, the eccentric member having an outer peripheral surface which is at an eccentricity from the axis of the rotary shaft and sliding surfaces which are held in sliding engagement with both side surfaces of the eccentric member holding portion of the rotary shaft; and a screw rod screwed into the eccentric member mounting portion and extending through the eccentric member mounting portion in a direction perpendicular to the axis of the rotary shaft, the screw rod having both ends rotatably supported by the eccentric member, such that a rotation of the screw shaft causes the eccentric member to move in the axial direction of the screw rod together with the screw rod, thereby causing a change in the amount of eccentricity of the outer peripheral surface of the eccentric member with respect to the axis of the rotary member.

In the eccentricity control device according to the present invention, the rotary shaft and the eccentric member are not allowed to rotate relative to each other. The eccentricity control device of the present invention, therefore, is devoid of any releasable locking mechanism which is used in the known eccentricity control device. When the screw rod is rotated while the rotary shaft is fixed, the eccentric member moves in the direction of axis of the screw rod as a unit with the screw rod, whereby the amount of eccentricity of the eccentric member with respect to the rotary shaft is controlled.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1:
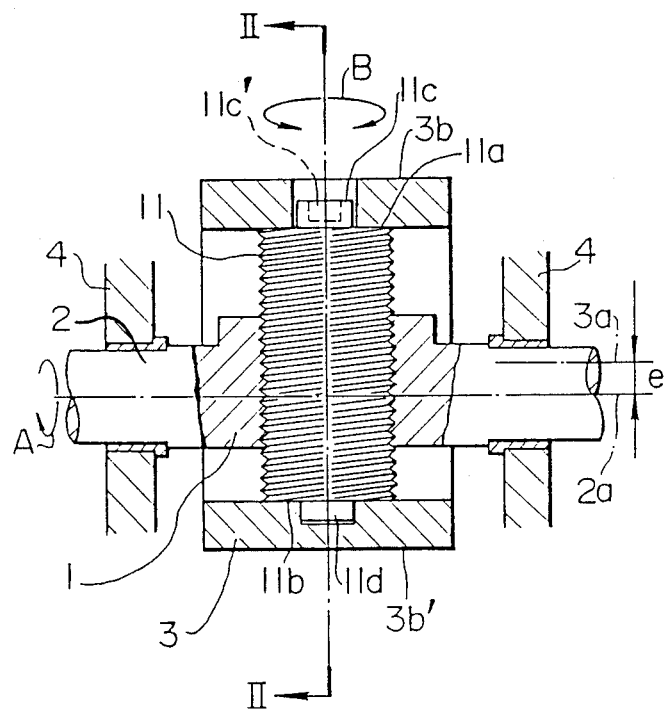
FIG. 1 is a longitudinal sectional view of an eccentricity control device according to the present invention.

Referring to the drawings, an eccentricity control device embodying the present invention has a rotary shaft 2 which is rotatably carried by, for example, a housing 4 and which is provided with an eccentric member mounting portion 1, and an eccentric member 3 fitting around an eccentric member mounting portion 1 and having outer peripheral surface $3b$, $3b'$ which is on a circle centered at an axis which is located at an eccentricity e from the central axis of the rotary shaft 2. The eccentric member mounting portion 1 has a substantially rectangular cross-sectional shape with parallel flat side surfaces $1a$ and $1b$ which slidingly engage with flat inner sliding surfaces $3c$ and $3d$ formed on the inner periphery of the eccentric member 3. As will be clearly understood from FIG. 2, the eccentric member 3 is composed of two halves: namely, an upper half part having the outer peripheral surface $3b$ and a lower half part having an outer peripheral surface $3b'$ which are integrally coupled to each other by means of bolts 18.

The eccentric member mounting portion 1 is provided at axially mid portion thereof with a threaded hole which extends in a direction perpendicular to the direction of the axis of the rotary shaft 2, and a screw rod 11 is screwed into this threaded hole. The screw rod 11 has both axial end surfaces $11a$ and $11b$ which abut the flat inner surfaces $3e$ and $3f$ of the eccentric member 3. End extremities $11c$ and $11d$ projecting from these end surfaces $11a$ and $11b$ are rotatably received in the holes formed in the eccentric member 3. A notch or recess 11c of a non-circular cross-section is formed in the end surface of the end extremity 11c for the purpose of engagement with a suitable rotary tool (not shown).

In operation, as the rotary shaft 2 is rotated about the axis 2a as indicated by an arrow A, the eccentric member 3 rotates about the above-mentioned axis 2a together with the rotary shaft 2. The transmission of the torque from the rotary shaft 2 to the eccentric member 3 is conducted without fail through mutual engagement between both side surfaces 1a, 1b of the eccentric member mounting portion 1 and the sliding surfaces 3c, 3d of the eccentric member 3. The amount e of eccentricity is varied by rotating the screw rod 11 as indicated by an arrow B, by a suitable tool engaged with the recess 11c' in the end extremity of the screw rod 11, while keeping the rotary shaft 2 against rotation. The rotation of the screw rod 11 causes the screw rod 11 to move in the axial direction thereof relative to the rotary shaft 2, with the result that the eccentric member 3 is moved together with the screw rod, whereby the amount e of eccentricity of the eccentric member with respect to the rotary shaft 2 is changed.

Figure 2:
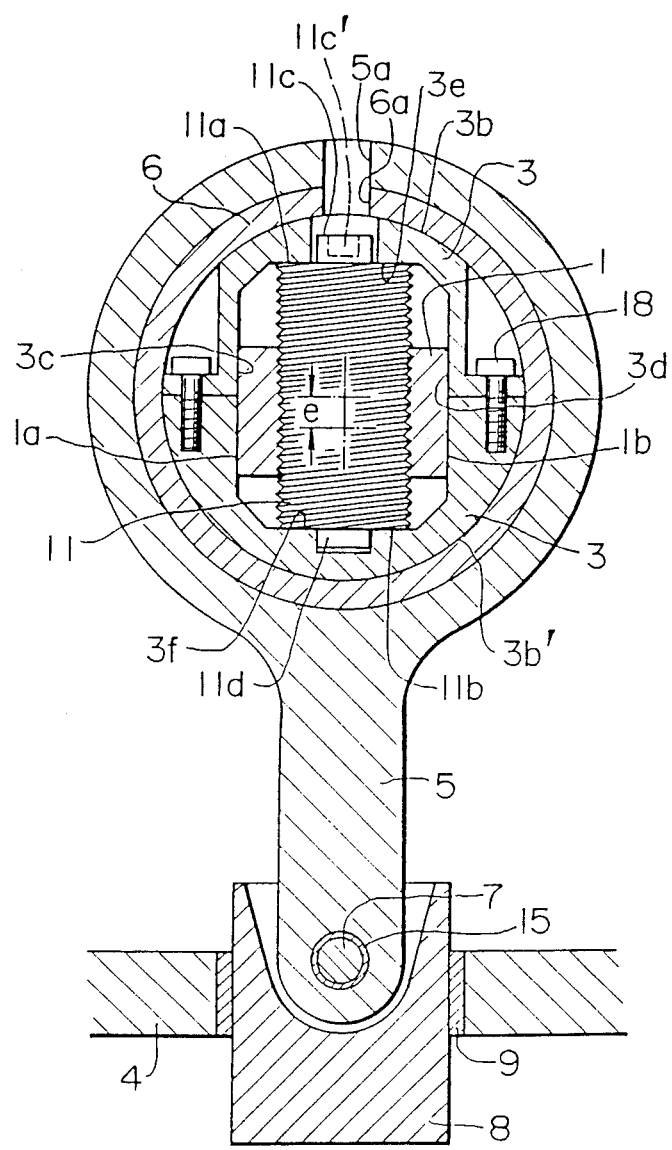
FIG. 2 is a sectional view taken along the line II—II of FIG. 1, illustrating the eccentricity device according to the present invention in a state of use as a stroke control mechanism of a press.

The described embodiment of the eccentricity control device of the present invention can be used, for example, as a stroke control device of a press. FIG. 2 illustrates the eccentricity control device used as such a stroke control device. The press has a connecting rod 5, the lower end of which is connected to a slide 8 of the press through a pin 7 and a slide bearing, while the upper end of the same is connected to a slide bearing 6 which fits around the eccentric member 3. Thus, the upper end of the connecting rod 5 is connected to the eccentric member 3 in such a manner as to be able to rotate relative to the eccentric member 3. Continuous holes 5a and 6a are formed in the connecting rod 5 and the slide bearing 6 so as to enable a suitable tool to reach the recess 11c' for the purpose of rotating the screw rod 11.

In operation, as the eccentric member 3 rotates as a unit with the rotary shaft 2, the connecting rod 5 moves up and down while oscillating its upper end portion, so that the slide 8 slides up and down along the slide bearing 9, whereby a press work is effected on a material which is placed between an upper die attached to the underside of the slide 8 and a lower die disposed under the slide 8. The length of the stroke of sliding motion of the slide is twice as large the above-mentioned eccentricity e. It is therefore possible to vary the stroke length of the slide by varying the amount of eccentricity e through rotating the screw rod 11.

As will be understood from the foregoing description, in the eccentricity control device of the present invention, the transmission of the torque from the rotary shaft to the eccentric member is made directly through the engagement between both side surfaces of the eccentric member mounting portion of the rotary shaft and the sliding surfaces of the eccentric member. In addition, the above-mentioned engagement locks the rotary shaft and the eccentric member in such a manner that they cannot rotate relative to each other. This arrangement eliminates the necessity for releasable lock mechanism which hitherto has been required in this type of device. In consequence, the construction of the eccentricity control device is simplified and the rigidity of the path of transmission of the torque is increased to enhance the precision of transmission of the torque. In addition, the eccentricity can be controlled linearly simply by rotating the screw rod. Furthermore, the amount of eccentricity can be indicated in terms of angle or amount of rotation of the screw rod with the aid of a suitable gradation, because the eccentricity e varies in proportion to the angle or amount of rotation of the screw rod.

What is claimed is:
1. An eccentricity control device comprising:
a rotary shaft having an eccentric member mounting portion with side surfaces;
a housing including means supporting said rotary shaft on each side of said eccentric member mounting portion;
an eccentric member mounted on said eccentric member mounting portion, said eccentric member having an outer peripheral surface which is at an eccentricity from the axis of said rotary shaft and sliding surfaces which are held in sliding engagement with both side surfaces of said eccentric member mounting portion of said rotary shaft; and
a rotatable screw rod screwed into said eccentric member mounting portion and extending through said eccentric member mounting portion in a direction perpendicular to the axis of said rotary shaft, said screw rod having both ends rotatably supported by said eccentric member such that a rotation of said screw rod causes said eccentric member to move in the axial direction of said screw rod together with said screw rod, thereby causing a change in said amount of eccentricity of said outer peripheral surface of said eccentric member with respect to the axis of said rotary shaft.

* * * * *